Nov. 3, 1970    C. M. RIVELY ET AL    3,537,886
FLASH EVAPORATION OF CORROSIVE MEDIA
Original Filed Sept. 22, 1964    2 Sheets-Sheet 2
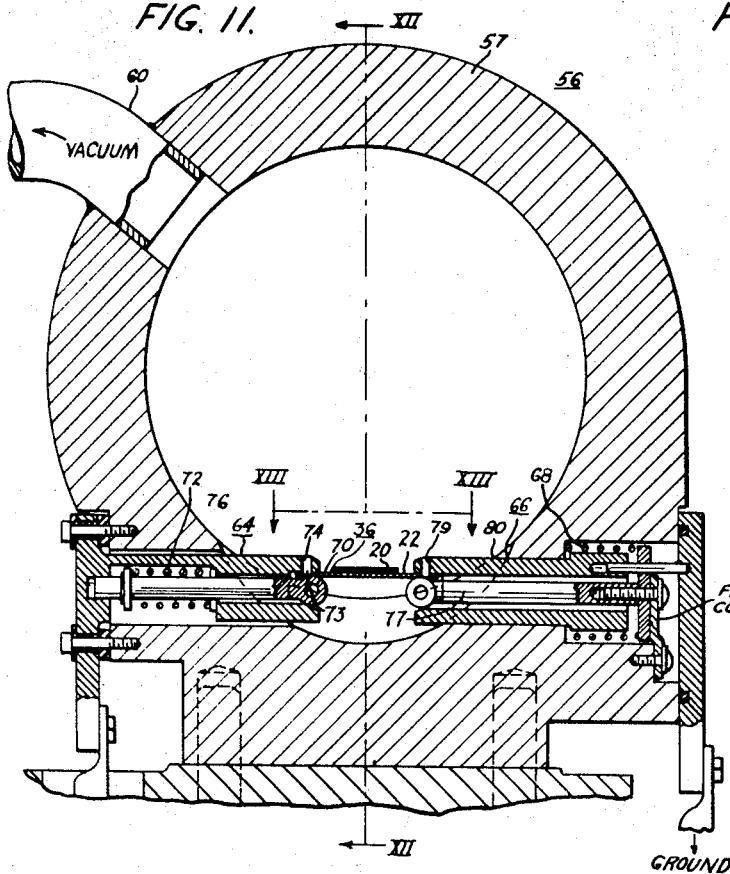
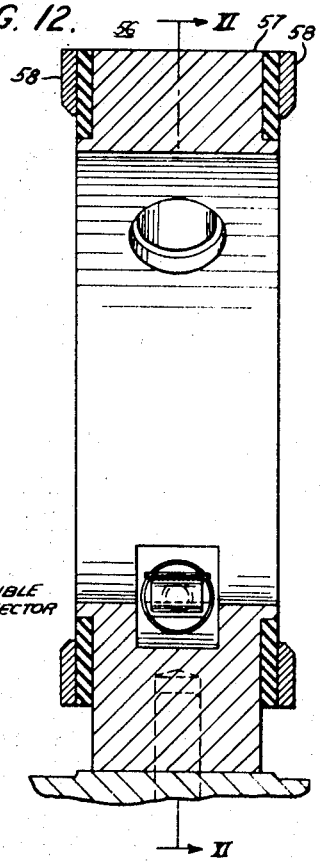
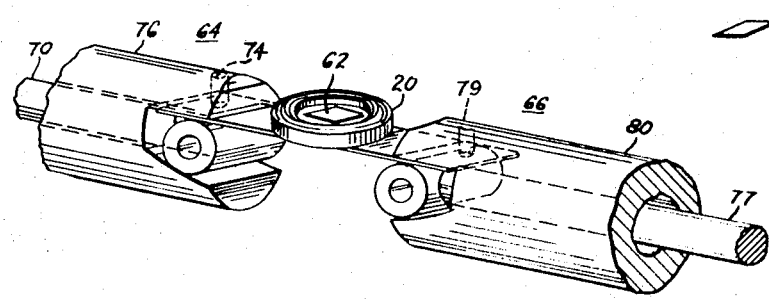
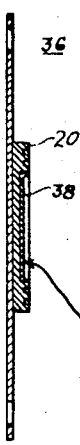
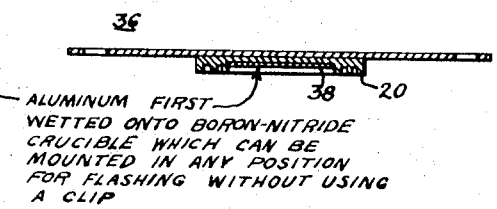
INVENTORS
CLAIR M. RIVELY AND
PHILLIP A. LIVERA
BY
W. D. Palmer
ATTORNEY United States Patent Office 3,537,886
Patented Nov. 3, 1970

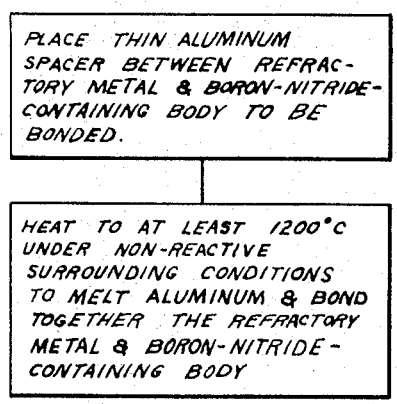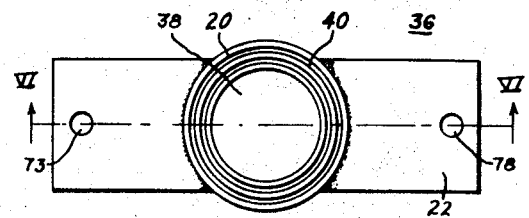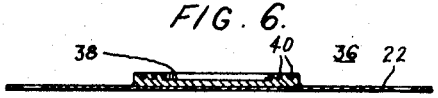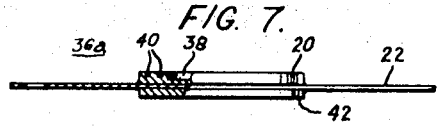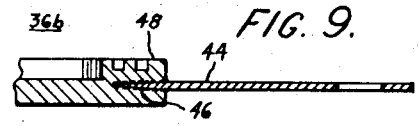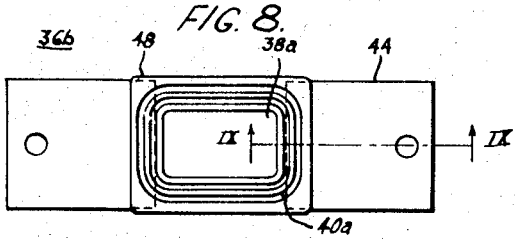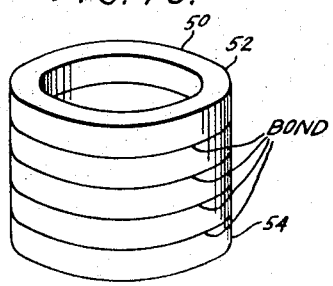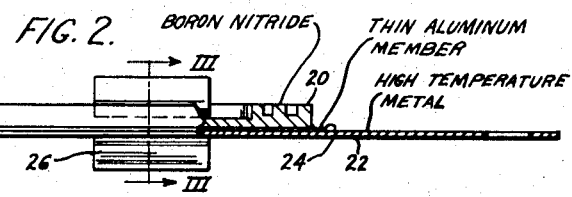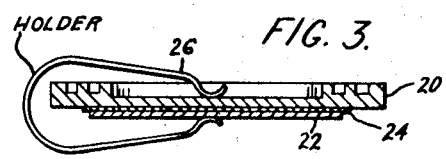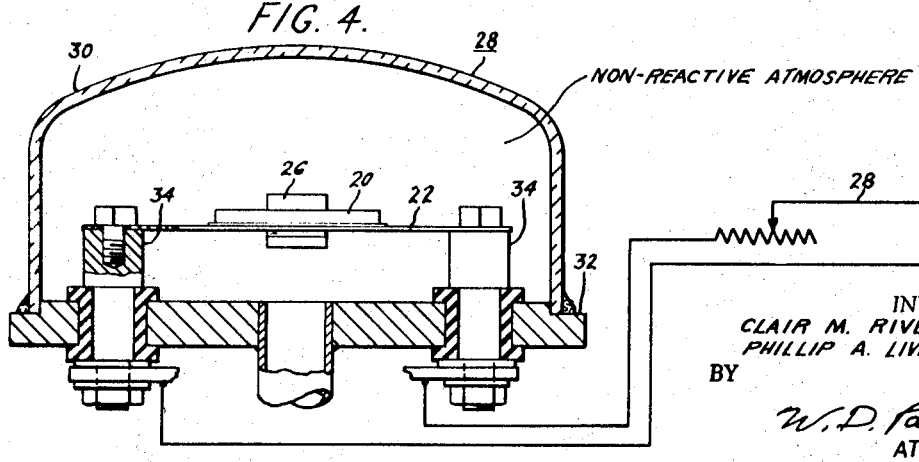

3,537,886
FLASH EVAPORATION OF CORROSIVE MEDIA
Clair M. Rively, Rockaway, and Phillip A. Livera, Bloomfield, N.J., assignors to Westinghouse Electric Corporation, Pittsburgh, Pa., a corporation of Pennsylvania
Original application Sept. 22, 1964, Ser. No. 398,274, now Patent No. 3,344,505. Divided and this application Apr. 13, 1967, Ser. No. 652,639
Int. Cl. C23c 13/12
U.S. Cl. 117—107                                      4 Claims

ABSTRACT OF THE DISCLOSURE

Method and apparatus for flash-evaporating aluminum onto a substrate wherein the aluminum to be evaporated is placed into a ceramic crucible which is bonded to a refractory metal member. The refractory metal member is self-resistance heated and is maintained under continuous tension to prevent buckling. The crucible has a depression therein to retain the aluminum and it is also provided with a plurality of grooves surrounding the depression to prevent aluminum from running onto the refractory metal strip.

---

This application is a division of copending application Ser. No. 398,274, filed Sept. 22, 1964, now Pat. No. 3,344,505, entitled "Flash Evaporation of Corrosive Media," and owned by the present assignee.

This invention generally relates to flash-evaporation of corrosive media such as aluminum and, more particularly, to a method of flash-evaporating a corrosive metal, and a flash-evaporating apparatus.

In forming reflecting coatings by a flash-evaporation process, it has been customary to utilize a self-resistance-heated tungsten evaporating coil which has physically supported therein a predetermined amount of the metal to be evaporated, such as aluminum. The tungsten coil is placed proximate the substrate or surface which is to be rendered reflecting and the atmosphere surrounding the coil and the surface is evacuated. The tungsten coil is then heated to a relatively low temperature to melt the aluminum so that it wets and flows over the tungsten. The temperature of the tungsten coil is then raised to cause the melted aluminum to evaporate and deposit as a thin layer on the surface which is to be rendered reflecting. Thereafter, the tungsten coil is heated to a still-higher temperature to complete the evaporation of any residual aluminum. During the flashing operation the aluminum tends to attack the tungsten flashing coil and after about thirty individual flashing operations, the tungsten coil has to be replaced. This not only necessitates slowing down production for the replacement of the coil, but represents a substantial coil replacement expense. There is also some product "shrinkage," such as when a coil fails during the formation of the reflecting coating.

The use of tungsten flash-evaporation coil can also result in specular coatings which are somewhat uneven. In explanation, when the aluminum is first melted and wets the coil, most of the melted aluminum runs to the lowest portion of the coil, due to gravity. Thereafter, when the melted aluminum is evaporated, the upper portions of the coil may provide some shielding between the evaporating aluminum and the surface to be coated. As another cause of uneven coatings, some of the flash-evaporation current passes through the aluminum as well as the tungsten heater coil. This can result in violent boiling of the aluminum at places where the layer of molten aluminum is relatively thin, resulting in "spitting" balls of aluminum onto the substrate.

It is necessary to manually insert the aluminum into the evaporator coil since the tungsten coils warp during each flash. This of course represents an increased labor cost.

It is the general object of the present invention to provide an improved flash-evaporating procedure which has substantially reduced maintenance and operational costs.

It is a further object to provide an improved flash-evaporating procedure for flash evaporating a reflecting metal such as aluminum from a refractory ceramic-type crucible which is bonded to a refractory metal.

It is an additional object to provide an improved flash-evaporating apparatus which utilizes a refractory ceramic-type crucible which is bonded to a refractory metal heater strip.

It is another object to provide a flash-evaporation method wherein the self-resistance heating current does not pass through the metal being evaporated.

It is still another object to provide a flash-evaporation method which results in improved specular coatings.

It is yet another object to provide a flash-evaporation apparatus wherein the metal to be evaporated can be automatically loaded into the evaporation crucible.

The foregoing objects of the present invention, and other objects which will become apparent as the description proceeds, are achieved by bonding a refractory body which includes at least an appreciable proportion of boron-nitride to at least one refractory metal of the group consisting of molybdenum, tungsten and tantalum. In forming this bond, the refractory body and the refractory metal are placed in proximate, abutting relationship and a thin aluminum strip or member is placed proximate those surfaces of the refractory body and the refractory metal which are to be bonded. The refractory metal and the refractory body are then heated to a temperature of at least 1200° C. under non-reactive surrounding conditions to cause the aluminum to melt and combine and the uncombined aluminum evaporates. This bonds together the boron-nitride-containing refractory body and the refractory metal, which can take the form of a heater member or strip. In performing flash evaporation of aluminum the aluminum to be evaporated is placed into the boron-nitride-containing body or crucible and the refractory metal heater strip is placed under tension so that it will not buckle when heated. The atmosphere surrounding both the flash-evaporating crucible and the surface to be made reflecting is evacuated and the refractory metal is rapidly self-resistance heated to a predetermined temperature to cause the aluminum contained therein to evaporate. The refractory metal strip is maintained under tension at all times during both heating and cooling in order to prevent any buckling thereof.

For a better understanding of the present invention, reference should be had to the accompanying drawings, wherein:

FIG. 1 is a flow diagram setting forth the essential method steps used in bonding the boron-nitride-containing body to the refractory metal;

FIG. 2 is an enlarged view, shown partly in section, illustrating the first step in bonding the ceramic crucible to the refractory metal;

FIG. 3 is a sectional view as taken on the lines III—III in FIG. 2, in the direction of the arrows;

FIG. 4 is a sectional elevational view showing the final step of bonding the refractory ceramic to the refractory metal;

FIG. 5 is an enlarged plan view of the preferred form of the bonded flash-evaporating member showing the boron-nitride-containing crucible bonding to a molybdenum strip;

FIG. 6 is a sectional elevational view taken on the lines VI—VI in FIG. 5 in the direction of the arrows;

FIG. 7 is an elevational view, partly in section, showing a modified flash-evaporating member where boronitride-containing, ceramic-type material is bonded to both sides of the refractory metal;

FIG. 8 is a plan view of another alternative embodiment for a flash-evaporating member wherein the evaporating ceramic-type crucible is electrically conducting and the refractory metal is bonded into the edges thereof in order to minimize any contact resistance;

FIG. 9 is a fragmentary enlarged sectional elevation taken along the lines IX—IX in FIG. 8 in the direction of the arrows;

FIG. 10 is a perspective view of a boron-nitride-container which has been formed by bonding together annular shaped sections of the ceramic which comprises the container;

FIG. 11 is a sectional elevational view taken on the lines XI—XI in FIG. 12 in the direction of the arrows showing constructional details for the flash-evaporating apparatus of the present invention;

FIG. 12 is a sectional elevational view taken on the line XII—XII in FIG. 11 in the direction of the arrows showing further details of the flash-evaporating apparatus;

FIG. 13 is a fragmentary perspective view showing construction details of the evaporator member retaining portion of the flash evaporating apparatus, as shown in FIGS. 11 and 12;

FIG. 14 is a perspective view showing an aluminum strip which is to be flash-evaporated in accordance with the present invention;

FIG. 15 is a sectional view of a flash-evaporating crucible and heater strip such as shown in FIGS. 5 and 6, but with aluminum wetting the evaporating surface so that the flashing operation can be accomplished in any position; and FIG. 16 is a sectional view corresponding to FIG. 15 but with the flash-evaporating crucible and heater strip shown in an inverted position.

With specific reference to the form of the invention illustrated in the drawings, in order to form the flash-evaporating member as used in the present apparatus, it is first necessary to bond a refractory body which includes at least an appreciable proportion of boron-nitride to a refractory metal, such as molybdenum, tungsten, tantalum or alloys thereof. In forming the bond, the boron-nitride or boron-nitride-containing crucible 20, as shown in FIGS. 2 and 3, is placed in proximate abutting relationship with respect to the refractory metallic strip 22 to which it is to be bonded. Between the crucible 20 and the strip 22 is placed a thin aluminum strip 24 and the formed composite is desirably held together by a metallic spring clamp or holder 26. The resulting clamp, refractory metal strip and crucible with the aluminum strip therebetween is then placed into a heating apparatus 28, as shown in FIG. 4, which comprises an air-tight cover 30 which hermetically fits over a base portion 32. Supports 34 which also serve as electrical lead-in conductors are sealed through and insulated from the base 32 and are adaped to retain the metallic strip 22 during the bonding operation. Preparatory to making the bond, the atmosphere within the apparatus 28 is preferably evacuated, although it can be filled with an inert gas such as argon. After evacuation or gas filling, the refractory metal strip 22 is heated, preferably in rapid fashion such as in twenty seconds, to a temperature of at least 1200° C. by self-resistance heating, in order to cause at least those portions of the strip 22 and the ceramic crucible 20 which are to be bonded to one another to heat to this temperature to melt and then evaporate the aluminum 24 between the ceramic body 20 and the refractory metal 22. This causes the crucible 20 and the metal 22 to abut and the reacted, non-volatilized aluminum forms a bond therebetween. Thereafter the refractory strip 22 is cooled and the now-bonded flashing member is removed from the bond-forming apparatus 28. The temperature used for bonding is preferably 1600° C. or higher, although temperatures between 1200° C. and 1600° C. can be used to form a generally satisfactory bond. Below 1200° C. the bond tends to be poor.

As an alternative method for forming the bond, the apparatus 28 could be modified so that it actually takes the form of an evacuable furnace. This would eliminate self-resistance electric heating of the metallic strip 22.

A finished flashing member 36 in its preferred form is shown in FIGS. 5 and 6 and comprises the refractory metal 22 such as molybdenum which has bonded thereto the boron-nitride containing crucible 20. It is not clear just how this bond is effected since boron nitride is extremely difficult to bond to any material. Certainly no aluminum metal as such remains between the boron-nitride crucible 20 and the refractory strip 22, since the flashing member 36 is heated during the flashing operation to a temperature substantially greater than the temperature at which aluminum evaporates. It is probable, however, that some aluminum-molybdenum-boron nitride complex is formed which effects the bond. Preferably the crucible 20 is formed with a central depression 38 which holds the aluminum during the flash-evaporation process. Intermediate the edges of the centrally disposed depression 38 and the periphery of crucible 20 are formed auxiliary grooves 40 which form a tortuous path to prevent the aluminum from running from the depression 38 onto the metallic strip 22 during the flashing operation. If the aluminum contacts the strip 22 during successive flashing operations, there will be some interaction. Boron-nitride, however is substantially inert to molten aluminum and in the presence of molten aluminum apparently forms some sort of corrosive-resistance layer (apparently aluminum nitride) on its surface.

In FIG. 7 is shown an alternative embodiment 36a for the flash-evaporator member wherein a disc 42 of similar refractory material is bonded to the bottom portion of the refractory metal strip 22, in order to minimize the effects of differences of thermal coefficient of expansion between the strip 22 and the crucible 20.

There are commercially available ceramic-type materials which comprises an appreciable proportion of boron nitride mixed with other ceramic materials, and which are modified slightly in order to render the normally insulating ceramic material electrically conductive, although the electrical resistance of the modified ceramic is still substantially greater than that of the refractory metal strip 20. Such ceramic-type materials can be used for vacuum-metallizing aluminum, for example, although considerable difficulties are encountered with contact resistance between the lead-in conductors and the refractory, ceramic-type crucible. An example of such a ceramic-type material comprises 50% by weight boron nitride and 50% by weight titanium diboride. A crucible made of ahis ceramic can have a refractory metal such as molybdenum, tungsten, tantalum, or alloys thereof bonded to edge portion thereof, in order to effect good electrical contact therebetween and minimize contact resistance between the refractory metal lead-in conductors and the ceramic crucible. A modified form 36b of the flash-evaporating member is shown in FIGS. 8 and 9, wherein molybdenum lead-in conductors 44 are bonded to slots 46 which are positioned in either side of the electrically conducting, evaporating crucible 48. In forming the bond, the molybdenum lead-in conductors 44 are positioned within the slots 46 contained at opposite sides of the crucible 48 and a small amount of aluminum is placed intermediate the molybdenum and the crucible. Upon heating in an oven to a temperature of at least 1200° C., and preferably 1600° C., the molybdenum lead-ins 44 securely bond to the crucible 48, thereby eliminating electrical contact problems between the molybdenum lead-ins 44 and the crucible 48. The crucible 48 generally corresponds to the preferred crucible embodiment 20 as shown in FIGS. 5 and 6 in that there is provided a centrally disposed cavity or container portion 38a for the material being flash-evaporated and grooves 40a are provided intermediate the central cavity and the periphery of the flash-evaporating crucible, in order to form a tortuous path to prevent the material being flash-evaporated from contacting the refractory metal lead-ins 44.

In FIG. 10 is shown a boron-nitrode container 50 which can be used to hold extremely corrosive materials. This container is formed by stacking annular-shaped, boron-nitride members 52 onto a boron-nitride disc 54, with a thin molybdenum spacer placed between each of the annular members 52 and between the bottom annular member and the disc 54, with aluminum spacers between the molybdenum and the ceramic. Upon heating to a temperature of 1200° C. and preferably 1600° C. under non-reactive conditions as described hereinbefore, the individual annular members 52 and the disc 54 will each bond to the molydenum spacers, thereby forming the illustrated boron-nitride container 50.

In all of the foregoing embodiments, the bonding apparently occurs between the boron nitride and the specified refractory metal, although other ceramic or ceramic-type materials can be included as a part of the composition of the crucible, such as in the case of the boron-nitride, titanium-diboride material as specified hereinbefore. In order to effect a bond, the refractory body or crucible which is bonded to the specified refractory metal should include at least 25% by weight of boron nitride.

In FIGS. 11 and 12 are shown a preferred flash-evaporating apparatus 56 which is used to vacuum-metallize an aluminium specular surface onto two sealed-beam lamp reflector bodies (not shown).

The apparatus 56 comprises a supporting annular member 57 which has sealing gasket members 58 positioned about the peripheral portion thereof against which the rim portion of sealed-beam glass reflector bodies abut, in order to form an evacuable enclosure. A vacuum is adapted to be drawn through the tubing 60. Prior to forming the enclosure by placing the lip or peripheral portions of the reflector bodies against the seals 58, a small strip of aluminum 62, as shown in FIG. 14 (20 milligrams constituting a sufficient amount), is placed into the boron nitride crucible 20. The flash evaporating member 36 is held between a fixed retaining member 64 and a sprin-loaded retaining member 66 and is maintained under continuous tension by means of the spring 68, which urges the retaining member 66 to the right, as viewed in FIG. 11. When inserting the flash-evaporating member 36 between the two retaining members 64 and 66, the inner retraining rod portion 70 of the retaining member 64, is pulled to the right, as viewed in FIG. 11, to overcome the compression of the spring 72 and the hole 73 (see FIG. 5) provided proximate the end of member 36 is engaged by the rod-shaped catch 74 which is affixed to the sleeve 76. Thereafter, the inner rod 70 is released so that it moves to the left and securely retains the left-hand side of the flash-evaporator member 36. The center rod portion 77 of the retaining member 66 is then pulled to the left by inserting a pin into the central aperture therein and forcing this central portion 77 to the left, as viewed in FIG. 11, to overcome the compression of the spring 68. The hole 78 (see FIG. 5) provided in right-hand end of the flash evaporator strip 36, is inserted over the cylindrical-shaped retaining means 79 which is affixed to the sleeve 80 of the right-hand retaining member 66. The central portion 77 is then released to secure the right-hand end of the flash evaporator member 36. The aluminum strip 62 is then placed into the crucible 20 and the sealed beam lamp reflector bodies are positioned about the peripheral portion of the apparatus 56 in order to form an evacuable enclosure. The formed enclosure is then evacuated and the molybdenum strip 22 is rapidly self-resistance heated to the temperature of 1500° C., for example, by applying a potential between the retaining members 64 and 66. This causes the aluminum to evaporate and deposit upon the sealed-beam lamp reflector bodies. Thereafter, the now-reflecting bodies are removed for the next step in lamp processing and an additional strip of aluminum is placed into the crucible 20, preparatory to the next flash-evaporating operation. The molybdenum strip 22 is maintained under continuous tension during the heating and cooling cycles by the spring 68, thereby preventing any buckling of the molybdenum strip 22.

For some special application, it is not necessary that the flash-evaporating member 36 be placed in a horizontal position, although it is preferred in order to prevent the molten aluminum from contacting the refractory metal 22. Such an alternative embodiment is illustrated in FIGS. 15 and 16 wherein the predetermined amount of aluminum which is to be flash evaporated is first placed into the central retaining portion 38 of the crucible 20. The crucible 20 is then heated in order to cause the aluminum to melt and wet the surface of the cavity 38 in the crucible 20. Thereafter, the crucible 20 can be placed in any position as desired and rapidly heated to such temperature as required to cause the aluminum to evaporate.

The resulting formed specular coatings are very uniform since the boron-nitride crucible 20 is evenly heated by the electrically heated molybdenum strip 20 and the evaporated aluminum is not masked by any evaporator coil portions. The apparatus 56 is particularly adapted to automatic loading of the aluminum to be evaporated since the position of the evaporator member 36 does not vary from one flashing operation to the next. As a further advantage when using the evaporator members 36 and 36a, as shown in FIGS. 5–7, the ceramic crucible 20 is heated solely by the metallic heater strip 22, since the electrical resistance of the ceramic crucible 20 is always substantially greater than that of the refractory metal strip 22. Thus, none of the heating current passes through the molten aluminum and the molten material evaporator quite uniformly.

The life of the present evaporator members is excellent and 400 to 500 flashing operations can be performed without replacing a member. Thus, effecting a savings in cost of the previous evaporator coils and minimizing equipment "down" time.

It will be recognized that the objects of the invention have been achieved by providing an improved flash-evaporating method and apparatus as well as a method for bonding a refractory metal to a boron-nitride-containing, ceramic-type crucible.

We claim as our invention:

1. The method of flash evaporating a metallic reflecting material from a relatively small crucible which is substantially non-reactive with respect to the metal to be evaporated and which crucible is bonded to an elongated, substantially straight, refractory metal strip intermediate the ends thereof, which method comprises:
    (a) supporting said metallic strip at spaced points with said crucible therebetween and on the upper surface of said strip;
    (b) placing into said crucible a predetermined amount of the metal to be flash evaporated;
    (c) evacuating the atmosphere surrounding said strip and said crucible;
    (d) rapidly self-resistance heating said strip to a predetermined temperature sufficient to heat said crucible and flash evaporate the metal contained therein while maintaining said strip under continuous mechanical tension to prevent any buckling thereof; and
    (e) cooling said metallic strip and said crucible while continuing to maintain said strip under continuous tension.

2. The method as specified in claim 1, wherein said strip is molybdenum and said crucible comprises at least an appreciable proportion of boron nitride.

3. A flash vacuum-metallizing apparatus comprising:
(a) enclosure means for retaining the surface to be vacuum metallized;
(b) evacuating means connected to said enclosure means for creating a substantial vacuum within said enclosure means;
(c) a refractory metal strip adapted to be self-resistance heated and supported in predetermined position within said enclosure means;
(d) a relatively small crucible, which is substantially inert with respect to the metal to be vacuum metallized, bonded to the upper surface of said metal strip, and the surface to be vacuum metallized positioned in receptive proximity with respect to said crucible to receive metal vapors evaporated from said crucible;
(e) electrical contact and retaining means comprising spaced members for retaining said metal strip on either side of said crucible and effecting electrical connection thereto;
(f) lead-in means for connecting the members comprising said electrical contact and retaining means to an external source of electric energy; and
(g) tension means for continuously urging apart the members comprising said electrical contact and retaining means to maintain a continuous tension on said metal strip and prevent any buckling thereof during vacuum metallizing.

4. A member for flash evaporization of aluminum, said member comprising:
(a) a refractory metal strip adapted to be self-resistance heated; and
(b) a refractory crucible which has a greater electrical resistance than that of said refractory metal strip and which is substantially inert with respect to molten aluminum, said crucible having one generally flattened surface bonded to said refractory metal, the crucible surface which is disposed opposite to said bonded surface having a depressed portion provided therein to retain aluminum during flash evaporation thereof, and a plurality of grooves in said crucible and surrounding said depression therein to prevent molten aluminum from running out of said depression and onto said refractory metal strip during the flash evaporation process.

References Cited
UNITED STATES PATENTS

| | | | |
|---|---|---|---|
| 2,962,538 | 11/1960 | Alexander | 117—107 |
| 3,063,865 | 11/1962 | Baer et al. | 118—49 |
| 3,234,022 | 2/1966 | Land et al. | 117—107 X |
| 3,265,528 | 8/1966 | Bond | 117—95 |

FOREIGN PATENTS 885,632   12/1961   Great Britain.

OTHER REFERENCES

Holland, Vacuum Deposition of Thin Flims, John Wiley & Sons, Inc., New York, 1956, pp. 4, 118–120.

ALFRED L. LEAVITT, Primary Examiner

W. E. BALL, Assistant Examiner

U.S. Cl. X.R.

118—49; 219—275, 427; 266—39